Nov. 25, 1924.

A. STEWART

CLUTCH

Filed Feb. 23, 1921

1,516,510

Inventor.
Alexander Stewart
by H. S. Dennison
atty.

Patented Nov. 25, 1924.

1,516,510

UNITED STATES PATENT OFFICE.

ALEXANDER STEWART, OF JOHNSTONE, SCOTLAND, ASSIGNOR TO THOMAS STEWART, OF TORONTO, ONTARIO, CANADA.

CLUTCH.

Application filed February 23, 1921. Serial No. 447,246.

*To all whom it may concern:*

Be it known that I, ALEXANDER STEWART, of Johnstone, Scotland, a subject of the King of Great Britain, have invented certain new and useful Improvements in Clutches, described in the following specification and illustrated in the accompanying drawings, that form part of the same.

The principal objects of this invention are to devise a form of clutch particularly adaptable for marine work, that is for motor boats, which will be of very simple construction, will not get out of order and is extremely simple and positive in its operation.

The principal feature of the invention consists in the novel construction and arrangement of parts whereby a double cone surfaced member is adapted to frictionally engage a stationary member or a driving member and said double cone member is operatively connected with a planetary gear to connect it with the rotating member or to hold it stationary to transmit either forward or backward movements to the driven shaft.

In the drawings, Figure 1 is an elevational and part vertical sectional view of my improved clutch.

Figure 1:
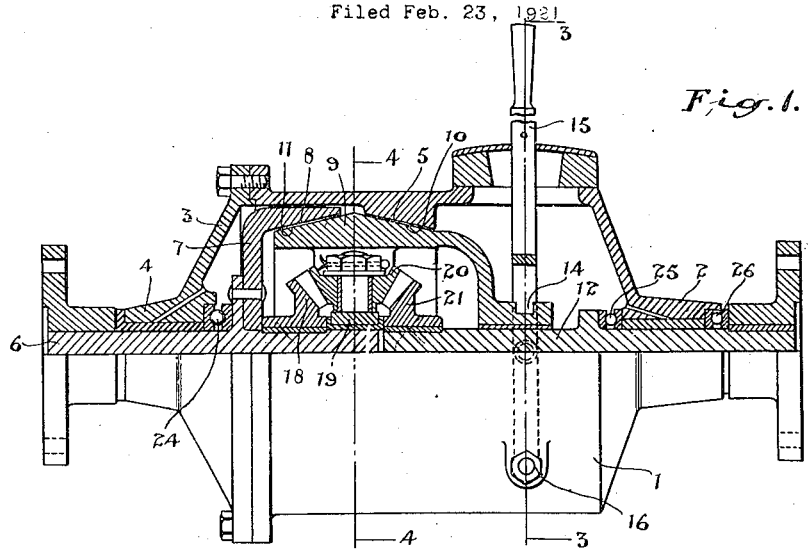
Figure 2:
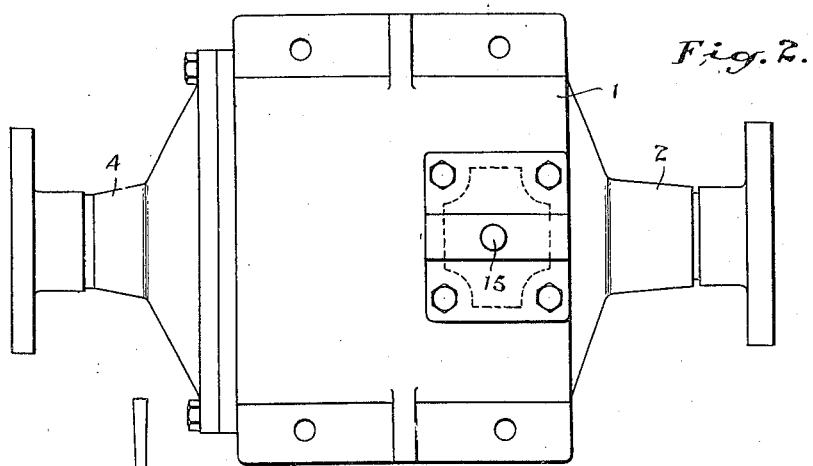
Figure 2 is a top plan view.
Figure 3:
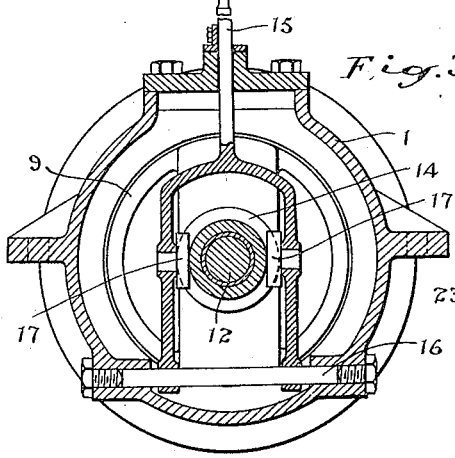
Figure 3 is a transverse section through the line 3—3 of Figure 1.
Figure 4:
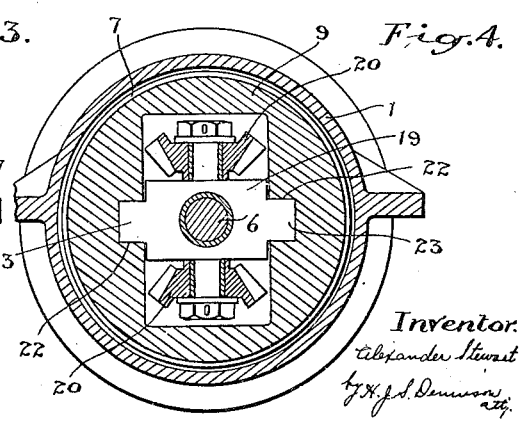
Figure 4 is a transverse section through the line 4—4 of Figure 1.

The device consists of a cylindrical casing 1 having a journal bearing 2 at one end and a cap 3 at the other end supporting a journal bearing 4. In the inner wall of the casing 1 intermediate of its length is formed a tapered clutch seat 5. The driving shaft 6 is journalled in the bearing 4 and to it is secured the clutch drum 7, which is provided with a tapered seat 8 corresponding with the seat 5 but arranged at the opposite angle therefrom.

A circular clutch member 9 is arranged between the clutch seats 5 and 8 and its outer periphery is formed with oppositely tapering surfaces 10 and 11, corresponding respectively with the taper of the seats 5 and 8.

The driven shaft 12 is journalled in the bearing 2 in alignment with the shaft 6 and the clutch member 9 is rotatably supported thereon and is adapted to slide longitudinally. The bearing portion is provided with a groove 14 and a yoke-shaped operating lever 15 pivotally mounted on the transverse bolt 16 at the bottom of the casing straddles the bearing portion and carries a pair of shoes 17 which extend into the groove. The lever extends upwardly through a slot in the top of the casing.

A bevel gear 18 is keyed to the drive shaft at the inner side of the clutch drum 7 and upon the inner end of the drive shaft is rotatably mounted a spider 19, which carries a plurality of bevel pinions 20 meshing with the bevel gear 18.

A bevel gear 21 is keyed to the adjacent end of the driven shaft and meshes with the pinion 20.

The clutch member 9 is formed with a pair of grooves 22 which extend transversely and at a sharp angle in relation to the axis of the shaft.

The spider is provided with a pair of projecting lugs 23 which extend into the notches 22. This connection between the spider and the clutch member 9 is of a helical nature and utilizes the torque of the engine for holding the clutch members in engagement after they have been moved by the lever.

It will be seen that when the lever is in the central position as shown in Figure 1, the clutch member 9 is free from the clutch seat 5 and clutch drum 7.

When it is desired to drive the driven shaft in the same direction as the driving shaft, the lever is pushed forward, thus locking the clutch member with the clutch drum 7 and rotating the spider. The angularity of the slots 22 bearing against the pins or lugs 23 of the spider, presses the clutch member forward and holds it in engagement and the pinions which cannot rotate carry the driven shaft around. When a reverse movement is desired the lever is moved backwardly to bring the seat 11 of the member 9 into engagement with the clutch seat 5 of the casing. The member 9 is thus held stationary and the pinions 20 are rotated on the spider, thus imparting a reverse movement to the driven shaft.

A thrust bearing 24 is arranged between the clutch drum 7 and the shaft 1 and reverse thrust members 25 and 26 are arranged at each end of the bearing 2.

A clutch such as described is extremely simple, easy to operate and not liable to get out of order.

The helical arrangement of 22 in the clutch member 9 is desirable for small clutches, but in larger clutches it may be necessary to provide an operating lever in the forward position. This may be accomplished in a number of different ways and does not form a necessary part of this invention.

What I claim as my invention is:—

In a clutch, a cylindrical casing having bearings at the ends, driving and driven shafts journalled in said bearings and having their inner ends abutting, bevel gears mounted on said shafts, a spider rotatably mounted on one of said shafts between said gears and having a pair of diametrically arranged lugs projecting therefrom, pinions journalled on said spider arranged diametrically opposite and meshing with said bevel gears, a floating clutch member slidable on the driven shaft and having a rectangular recess enclosing said spider, the side walls of said recess having helical notches into which said spider lugs extend, a tapered clutch seat on said casing, a tapered clutch member on the driving shaft, and means for shifting the floating clutch member.

ALEXANDER STEWART.

Witnesses:
ARCH'D N. CAMPBELL,
JAMES H. MACNIVEN.